Figure 1:
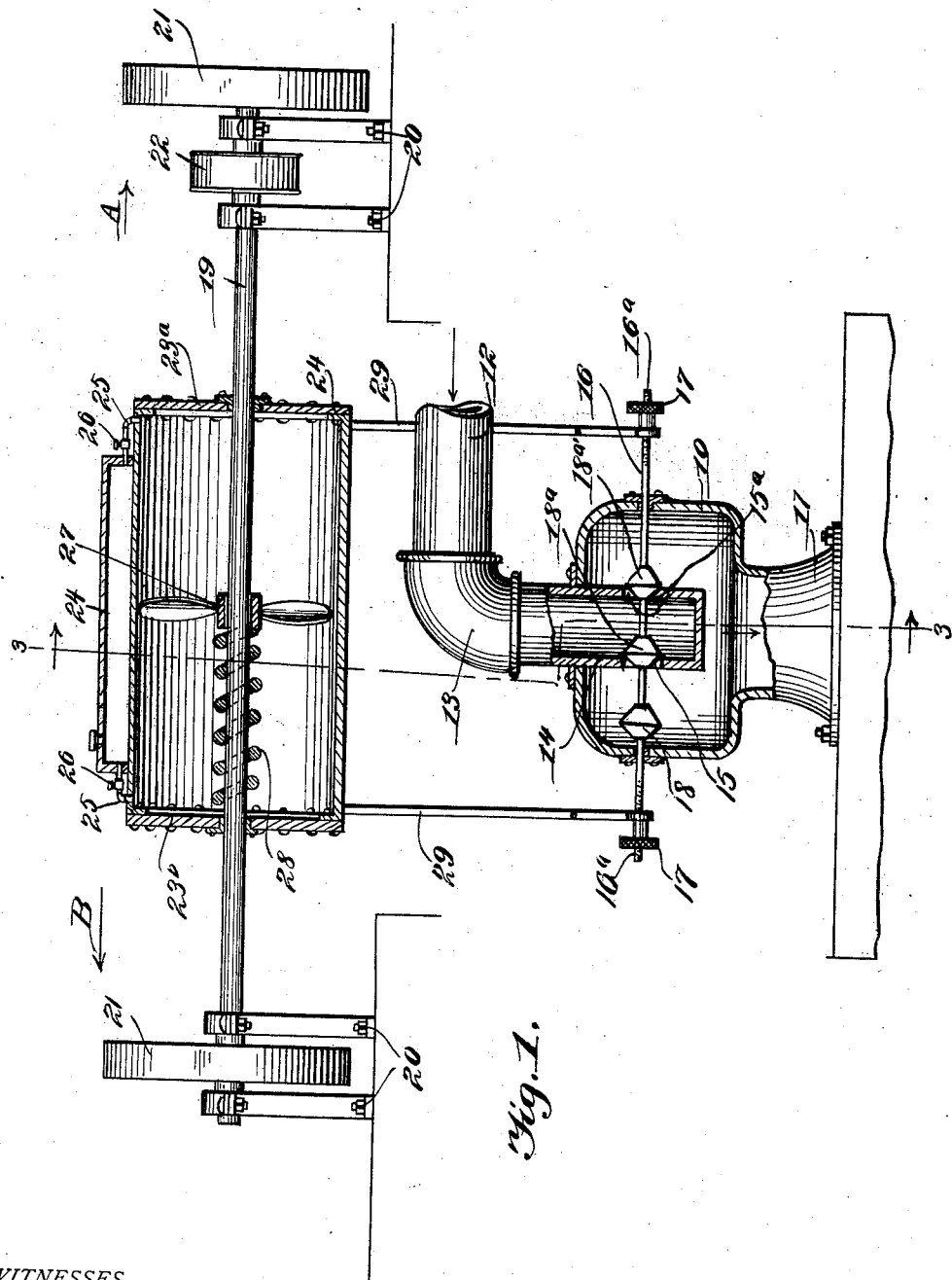

S. R. ADAMS & L. H. JACKSON.
COMBINED VALVE AND GOVERNOR.
APPLICATION FILED DEC. 4, 1911.

1,079,626.

Patented Nov. 25, 1913.
2 SHEETS—SHEET 1.

WITNESSES
William Linton
Charles J. Wilson

INVENTORS
Stephen R. Adams.
and Leonard H. Jackson
By Wm C. W. McIntire
Attorney S. R. ADAMS & L. H. JACKSON.
COMBINED VALVE AND GOVERNOR.
APPLICATION FILED DEC. 4, 1911.
1,079,626.
Patented Nov. 25, 1913.
2 SHEETS—SHEET 2.
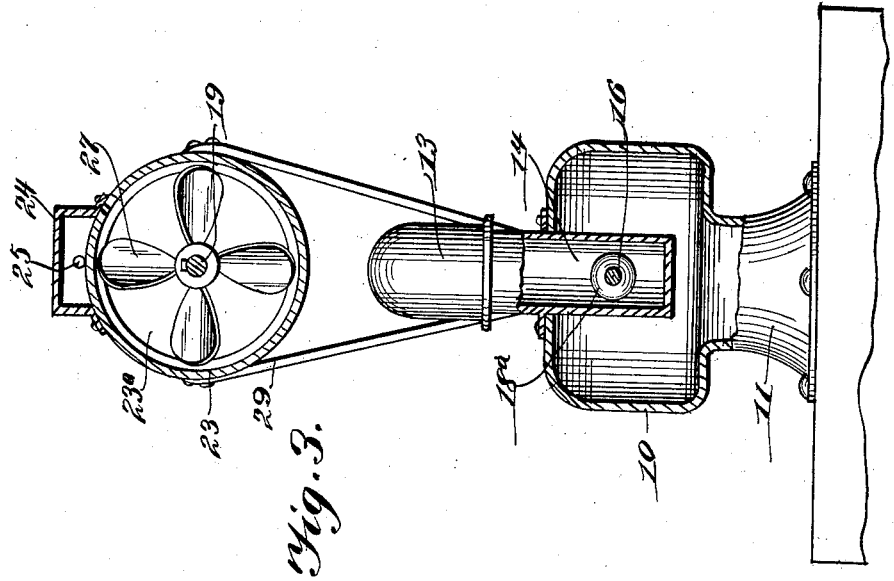
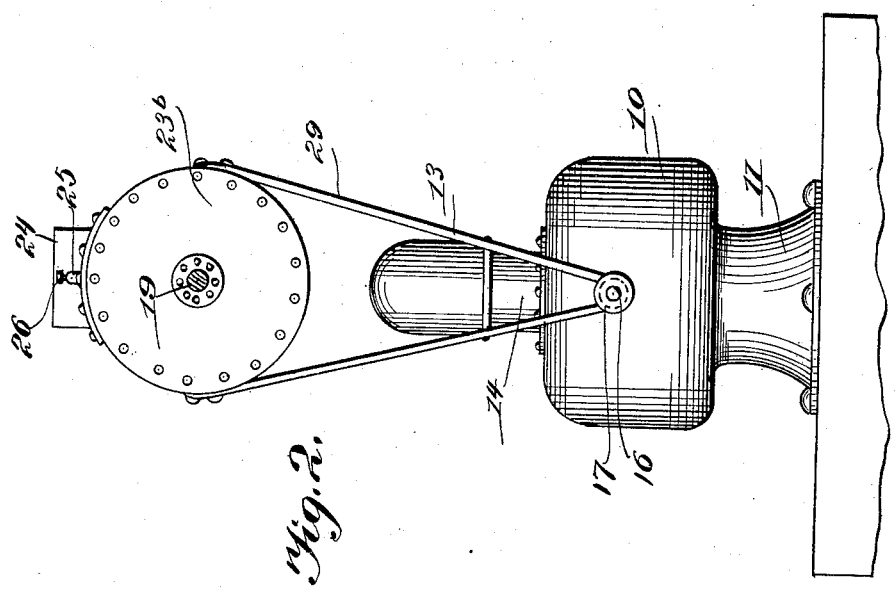
WITNESSES
INVENTORS
Stephen R. Adams.
Leonard H. Jackson
By
Attorney

UNITED STATES PATENT OFFICE.

STEPHEN R. ADAMS AND LEONARD H. JACKSON, OF AMERICAN FORK, UTAH.

COMBINED VALVE AND GOVERNOR.

1,079,626.  Specification of Letters Patent.  Patented Nov. 25, 1913.

Application filed December 4, 1911. Serial No. 663,742.

*To all whom it may concern:*

Be it known that we, STEPHEN R. ADAMS and LEONARD H. JACKSON, citizens of the United States, residing at American Fork, in the county of Utah and State of Utah, have invented certain new and useful Improvements in Combined Valves and Governors; and we do hereby declare the following to be a full, clear, and exact description of the invention, such as will enable others skilled in the art to which it appertains to make and use the same.

This invention relates to combined valves and governors, and is designed to provide a means whereby the speed by which the engine operates may readily be regulated, and at the same time provide a positively actuated valve for admitting steam to the cylinders of the engine.

Heretofore it has been customary to use a governor provided with fly balls connected to a complicated regulating device which frequently became objectionable by reason of friction, gumming and mis-adjustment.

The present invention is designed to overcome these objectionable features and to provide a device simple and inexpensive to manufacture and without necessity for delicate adjustment.

With the above and other objects in view, this invention consists in the construction, combination and arrangement of parts, all as hereinafter more fully described, claimed and illustrated in the accompanying drawings, wherein:

Figure 1 is a central vertical section illustrating the valve casing and the coöperative governor structure; Fig. 2 is an end elevation thereof; and Fig. 3 is a section taken along line 3—3 of Fig. 1.

A valve casing of cylindrical formation is mounted adjacent to the engine, and is provided with a suitable steam inlet. This steam inlet is closed at its lower terminal and is pierced by diametrically disposed openings in the sides thereof, said openings constituting valve seats for the valves rigidly retained upon the rod transversely arranged within the casing. There are three of these valves, two of which are adapted to close off the supply of steam when the engine is not running, and the third, in combination with one of the two heretofore referred to, is adapted to lessen the supply of steam when the engine exceeds the predetermined limit of speed. Superposed above the casing is a shaft rotatably mounted in suitable bearings which has slidably mounted thereon an air tight casing, said air tight casing carrying an oil tank which is connected thereto by suitable pet cocks, as will hereinafter be more fully described. Dependent arms are rigidly secured to the said governor casing in each terminal thereof, and are adjustably secured to the rod or shaft carrying the valves. A fan is rigidly mounted upon the shaft carrying the governor casing and has a spring interposed between one side thereof and the adjacent terminal of the same. It is understood that as the fan rotates, the governor casing will be moved along the shaft, as will be hereinafter more fully described.

Reference being had more particularly to the drawings, 10 indicates a valve casing of any suitable construction, mounted upon a tubular pedestal 11, which provides a connection between said valve casing and the cylinders for the engine. A steam pipe 12 is superposed above the casing 10 and carries at its terminal an elbow 13 which connects the steam pipe 12 with the cylindrical section of piping 14 which projects into the casing 10 and which is closed at its lower terminal.

A pair of diametrically disposed openings 15 and 15ª are formed adjacent to the closed terminal of the cylindrical section of pipe 14, and constitute valve seats, as will hereinafter be more fully described and pointed out.

A rod 16 is mounted for transverse reciprocation in the casing 10, having its outer terminal 16ª threaded for the reception of the nuts 17, the function of which will hereinafter be more fully described. Mounted on the rod 16 adjacent to the opening 15 of the pipe 14 is a valve 18 adapted to operate on the exterior of said pipe and provided with double beveled surfaces, the inner of said beveled surfaces being longer than the outer thereof and adapted to operate in the opening 15. A similar valve 18ª is mounted upon the rod 16 within the section of pipe 14 and is likewise provided with double beveled surfaces, the longer of which is adapted to coöperate with the opening 15ª, while the shorter thereof is adapted to coöperate with the opening 15. Formed on the exterior of the section of pipe 14 and oppositely disposed to the valve is a similar valve 18ª′ which is also provided with double beveled surfaces, the inner of which is longer and adapted to operate in the opening 15ª. These double beveled surfaces on the valves provide a means for cutting off the steam whenever the speed rises sufficiently above a predetermined maximum or falls sufficiently below a predetermined minimum pressure. It will clearly be understood that as the rod reciprocates, the valves 18, 18ª and 18ª′ will move into and out of engagement with the openings 15 and 15ª, as will hereinafter be more fully described.

In order to provide a means whereby the rod 16 may be reciprocated to regulate the speed of the engine, a shaft 19 is mounted upon the bearings 20 and superposed above the valve casing 10, said shaft carrying at its terminal the balance wheels 21, which will be hereinafter more fully described, and adjacent to one of said balance wheels a pulley 22, which is adapted to be rotated by any suitable belt of the engine. A governor cylinder 23 is mounted concentrically for reciprocation upon the shaft 19 and carries an auxiliary tank 24 which is adapted to contain oil, said oil being conducted from the tank 24 to the cylinder 23 by the pipes 25 extending from said tank to the terminals of said cylinder, said pipes having pet cocks 26 therein to regulate the flow of the oil. A fan 27 is keyed upon the shaft 19 in such a manner that as the shaft rotates the fan will rotate and exert a pressure upon the terminal 23ª of the cylinder 23. A spring 28 is interposed between the opposite side of the fan 27 and the adjacent end 23ᵇ of the cylinder in such a manner that as the fan ceases rotating the cylinder will be returned to its normal position, closing off the supply of steam. A dependent bracket 29 is secured to each end of the cylinder 23 and has its lower terminal secured to the threaded terminals 16ª of the rod 16 by the nuts 17. Thus, upon the movement of the cylinder 23, the rod 16 will likewise be moved. Assuming that the engine is stationary, and the valves 18, 18ª and 18ª′ are in the position illustrated in Fig. 1, to wit: the valve 18ª forming the closure for the port 15 and the valve 18ª′ forming the closure for the port 15ª, the engine is started. This will cause the shaft 19 and consequently the fan 27 to rotate exerting a pressure upon the oil within the cylinder 23, and upon the terminals 23ª thereof. It will be evident that while the swift rotation of the fans 27 may temporarily close the valves in one direction, and the sudden slacking of motion due to an overload on the engine may close them in the other direction, the pressure of spring 28 is such as normally to hold the valves in open position when the device is in a state of rest in readiness to take steam from the throttle. There is a certain amount of lost motion between the spring 28 and the terminal 23ᵇ of the cylinder 23 and when the steam is turned on sufficient passes through the slight opening in the valve to start the engine, whereupon the valves move over to the opposite side of the casing to that shown in Fig. 1 to almost close the ports, the lost motion taken up, and the initial compression is given to the spring 28. This will cause the cylinder to move in the direction indicated by the arrow A, Fig. 1, and move the valves 18ª and 18ª′ from the ports 15 and 15ª respectively, and permit the steam to pass from the pipe 12 through the pipe 14, the ports 15 and 15ª through the pedestal 11 to the engine. Should the engine acquire a speed beyond that desired, the cylinder 23 will continue to move in the direction of A and will bring the valve 18 into engagement with the port 15, and the valve 18ª into engagement with the port 15ª, thus shutting off the supply of steam and permitting the engine to decrease its speed. The balance wheels 21 obviously maintain the momentum of the shaft 19 after the valves have been partially closed, which action will tend to gradually close the valves instead of rapidly moving them to a closed position by the recoil action of the spring 28, as the maintained momentum of the shaft causes the fan to force air against the end 23ª of the cylinder to move it in the direction that will keep the valve open. After the engine has decreased its speed sufficiently, the pressure of the spring 28 against the cylinder head 23ᵇ will move the cylinder 23 in the direction of the arrow B and remove the valve 18 from engagement with the port 15 and the valve 18ª from engagement with the port 15ª, thereby returning the speed of the engine to its normal velocity.

Having thus fully described our invention, what we claim as new and desire to secure by U. S. Letters Patent is:

1. In a valve, a tubular pedestal, a valve casing mounted thereon provided with oppositely disposed openings, a steam pipe projecting into said casing closed at its lower terminal and provided with a pair of diametrically oppositely disposed openings in alinement with the openings in said casing, valve seats in said openings, a longitudinally reciprocal rod mounted in the openings in said casing and said pipe, a valve mounted on said rod interiorly of the steam pipe, valves mounted in said casing exteriorly of said steam pipe adapted to cut off the steam from the casing when the rod is reciprocated to its limit in either direction, and means for controlling the reciprocal throw of the rod.

2. In a valve, a valve casing provided with diametrically oppositely disposed openings, a steam pipe closed at its lower terminal projecting into said casing and provided with a pair of diametrically disposed openings in alinement with the openings in the casing, a longitudinally reciprocal rod provided with threaded extremities mounted in the openings in steam pipe and valve casing, valves mounted on said rods adapted to shut off the steam from said casing when the rod is reciprocated to its limit in either direction, screw members adjustably mounted on the ends of the rod to regulate the reciprocal throw of said rod.

In testimony whereof we affix our signatures in presence of two witnesses.

STEPHEN R. ADAMS.
LEONARD H. JACKSON.

Witnesses:
 JAMES CHIPMAN, Jr.,
 JARVIS AYDELOTTE.